United States Patent
Austermann et al.

(10) Patent No.: US 8,579,099 B2
(45) Date of Patent: Nov. 12, 2013

(54) PARKING INTERLOCK DEVICE FOR AN AUTOMOTIVE TRANSMISSION

(75) Inventors: Bernd Austermann, Meckenbeuren (DE); Tobias Miller, Waldburg (DE); Matthias List, Friedrichshafen (DE); Karl-Hermann Katzoreck, Tettnang (DE); Thomas Breitweg, Schwabisch Gmund (DE); Armin Rasch, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 88 days.

(21) Appl. No.: 13/277,418

(22) Filed: Oct. 20, 2011

(65) Prior Publication Data
US 2012/0097497 A1   Apr. 26, 2012

(30) Foreign Application Priority Data
Oct. 26, 2010 (DE) .......... 10 2010 042 917

(51) Int. Cl.
*F16H 63/34* (2006.01)
*F16H 63/38* (2006.01)

(52) U.S. Cl.
USPC .................. 192/219.5; 74/577 S

(58) Field of Classification Search
USPC .................. 192/219.5, 219.4
See application file for complete search history.

(56) References Cited

U.S. PATENT DOCUMENTS

| | | | |
|---|---|---|---|
| 4,200,002 A | 4/1980 | Takahashi | |
| 7,025,188 B2 * | 4/2006 | Lindenschmidt et al. | 192/219.5 |
| 2008/0053170 A1 | 3/2008 | Kirchner | |
| 2009/0173594 A1 * | 7/2009 | Joshi et al. | 192/219.5 |
| 2010/0108460 A1 | 5/2010 | Nakamura et al. | |

FOREIGN PATENT DOCUMENTS

| | | |
|---|---|---|
| DE | 10 2006 042 637 A1 | 3/2008 |
| DE | 11 2008 000 433 T5 | 12/2009 |
| EP | 1 895 206 A1 | 3/2008 |

* cited by examiner

*Primary Examiner* — David D Le
*Assistant Examiner* — Mark Manley
(74) *Attorney, Agent, or Firm* — Davis & Bujold, PLLC; Michael J. Bujold

(57) ABSTRACT

A transmission parking lock device having a gearwheel with teeth and gaps and a pawl having a pawl tooth. The gearwheel rotates and the pawl pivots about axes that are parallel to each other. The gearwheel teeth each have a first contour and tooth flanks with respect to rotation of the gearwheel. The pawl tooth has a second contour and tooth flanks relative to the rotation of the gearwheel, and the gearwheel has an outer radius. The gearwheel and pawl are kinematically linked by a linear relationship between the pivoting and rotational angles. The first and/or second contour are at least partially circular with a radius of the outer radius of the gearwheel, and the teeth and/or the pawl tooth have, in the area of the front tooth flank of the gearwheel or parking lock pawl, a crown tip relief relative to the outer radius of the gearwheel.

17 Claims, 9 Drawing Sheets

PARKING INTERLOCK DEVICE FOR AN AUTOMOTIVE TRANSMISSION

This application claims priority from German patent application serial no. 10 2010 042 917.1 filed Oct. 26, 2010.

FIELD OF THE INVENTION

The invention concerns a parking lock device for an automotive transmission.

BACKGROUND OF THE INVENTION

Parking locks, which are designed to prevent a motor vehicle with an automatic transmission from inadvertently rolling away, are subject to various criteria, among which in particular a rejection condition at higher vehicle speeds must be fulfilled. In general a parking lock is designed for a particular drop-in speed, i.e. a limit speed of the vehicle at which the locking pawl can still just drop into a tooth gap so that the locked position is reached. Above this limit speed it must be ensured that the pawl tooth does not drop into a tooth gap, but is kept out by virtue of the teeth or tooth contour. The rejection of the locking pawl above the drop-in speed is known as "ratcheting" and, depending on the tooth geometry, results in a dynamic that damages the components. It has therefore already been proposed that by virtue of a suitable tooth carrier, the rejection of the locking pawl takes place as gently as possible.

EP 1 895 206 B1 discloses a parking lock device for a motor vehicle transmission, which comprises a parking lock gearwheel with circumferential teeth and a parking lock pawl with a pawl tooth or catch which engages in a tooth gap of the parking lock gearwheel to lock a transmission output shaft. At the crown of the pawl tooth or catch as viewed in the rotation direction of the parking lock gearwheel, the pawl tooth or catch has a rounded tooth contour which follows a defined logarithmic function or a defined exponential function. The shape of the logarithmic or exponential function is characterized by varying curvature, such that the curvature is most pronounced in the area of the forward tooth edge and least so in the area of its rear edge. Thus, as viewed in the rotational direction of the parking lock gearwheel the curvature of this tooth contour decreases with the width of the tooth. Due to this rounding of the tooth, above the drop-in speed and up to a maximum speed of the vehicle the locking pawl should be rejected with a low impulse magnitude, in particular with an approximately constant magnitude. Disadvantageously, however, the impulse exerted on the parking lock pawl during ratcheting depends very much on the exact position of the contact point at which the pawl tooth of the parking lock pawl meets a tooth of the parking lock gearwheel. The resulting scatter can be perceived by the driver of the vehicle as annoying.

SUMMARY OF THE INVENTION

The purpose of the present invention, with a parking lock device of the type mentioned at the beginning, is to achieve as gentle and material-sparing rejection as possible of the locking pawl above the drop-in speed and up to higher vehicle speeds, and thus to reduce the impact loading of the locking pawl that takes place during ratcheting.

The invention starts from a parking lock arrangement known from the prior art, with a parking lock gearwheel having teeth and tooth gaps and with a parking lock pawl having a pawl tooth, which for the purpose of arresting the parking lock gearwheel can pivot so as to engage in one of the tooth gaps of the parking lock gearwheel. In this arrangement the parking lock gearwheel rotates about its rotational axis and the parking lock pawl pivots about its pivot axis, which is arranged parallel to the rotational axis of the parking lock gearwheel. In a known manner the teeth of the parking lock gearwheel each have at the crown a first contour and, viewed in the rotational direction of the parking lock gearwheel, respective front and rear tooth flanks, whereas the pawl tooth of the parking lock pawl has at its crown a second contour and, relative to the rotational direction of the parking lock gearwheel, a front and a rear tooth flank.

The invention provides for a linear relationship between the pivot angle of the parking lock pawl and the rotational angle of the parking lock gearwheel, so that the pivoting speed of the parking lock pawl is constant. By contrast with the type-defining prior art, during ratcheting an impulse exerted on the parking lock pawl in the contact area of the crown contours of the pawl tooth and the tooth crown of the parking lock gearwheel is consequently independent of the exact point of contact. In this case the value of the pivoting speed, i.e. the change of pivoting angle, is a measure of the impulse. Thanks to the constant impulse on the parking lock pawl, the impact response during ratcheting, i.e. the loading of the components, is also reduced.

To approximate this linear kinematic behavior the invention provides that the first contour formed on the crown of the parking lock gearwheel's teeth and/or the second contour formed on the pawl tooth of the parking lock pawl conform at least partially with a mathematical function whose curvature differs by no more than 20% from the outer curvature of the parking lock gearwheel. In this case, in the area of the front tooth flanks of the parking lock gearwheel and/or the parking lock pawl, the teeth of the parking lock gearwheel and/or the pawl tooth of the parking lock pawl show a defined tip relief of the crown relative to the outer radius of the parking lock gearwheel. The outer curvature of the parking lock gearwheel is defined as the reciprocal value of the outer radius of the parking lock gearwheel. In the ideal case this geometry results in a linear relationship between the pivoting angle of the parking lock pawl and the rotational angle of the parking lock gearwheel and hence in a constant pivoting speed of the parking lock pawl, so that the impulse exerted on the parking lock pawl when the crown contours of the pawl tooth and the tooth crown of the parking lock gearwheel meet, does not depend on the exact point of contact.

Those with an understanding of the subject will be able to choose a suitable mathematical function that represents this (ideal) kinematic behavior sufficiently well for the accuracy demanded for the purposes of the application concerned, if necessary also taking into account relevant aspects of production technology.

A first example of such a mathematical function is a circle whose radius is no more than 20% different from the outer radius of the parking lock gearwheel. A second example of such a mathematical function is an ellipse whose semi-axes differ by no more than 20% from the outer radius of the parking lock gearwheel. The desired linear relationship between the pivoting angle of the parking lock pawl and the rotational angle of the parking lock gearwheel cannot be produced with sufficient accuracy either by the logarithmic function, or by the exponential function known from the prior art.

To approximate the linear kinematic behavior in design terms the invention provides that the contour of the teeth of the parking lock gearwheel ("first contour") and/or the contour of the pawl tooth ("second contour") are formed as a circular arc located in the area of the outer radius of the parking lock gearwheel. Thus, either the crown of the teeth of the parking lock gearwheel and/or the crown of the pawl tooth of the parking lock pawl are—at least partially—in the shape of circular-cylindrical surfaces, i.e. surfaces with a constant curvature. Furthermore, in the area of the leading tooth flank in the rotational direction a maximum crown tip relief on the teeth and/or on the pawl tooth is provided. Advantageously, the result of this crown tip relief is that above the drop-in speed the pawl tooth does not engage, or not too deeply, in a tooth gap of the parking lock gearwheel, which could otherwise lead to damage or failure. According to the invention, the crown tip relief varies in the direction of the rear tooth flank in accordance with a circular function. By virtue of this circular function, i.e. due to the constant curvature, in the contact area of the crown contours the pivoting angle of the parking lock pawl increases approximately proportionally to the rotational angle of the parking lock gearwheel.

In this case, in relation to the rotational axis, ideally the first contour is convex and the second contour of concave shape. As a variant of this, the convex contour of the teeth of the parking lock gearwheel can also co-operate with a flat or non-concave contour of the pawl tooth. Another variant can even provide that the pawl tooth is formed with a concave tooth contour which co-operates with a parking lock gearwheel having tooth contours without any crown tip relief, i.e. a cylindrical outer contour.

In a further preferred embodiment the crown tip relief is composed of a fraction for the wheel and a fraction for the pawl, such that the fractions preferably behave as the tooth widths of the wheel teeth and the pawl tooth. In this way the linear kinematic behavior is maintained throughout the contact area during the contact of the teeth, i.e. with a constant impulse and reduced dynamic loading of the parking lock.

According to a further embodiment, in the area of the forward and rear tooth flanks additional crown tip reliefs are provided, which decrease in accordance with a circular function in the direction toward the middle of the tooth. Thus, the tooth contour is formed by two circular arc sections with different mid-points. This embodiment is particularly advantageous for driving forward and in reverse, i.e. ratcheting in both rotational directions of the parking lock gearwheel, because the parking lock pawl is safely rejected in both rotational directions, and this, by virtue of the constant curvature of the tooth contour with a constant impulse. In relation to the tooth width the two circular arc sections can have different lengths, for example in the ratio 1:2 or 1:3. This division is provided having regard to the different forward and reverse driving speeds.

According to a further embodiment the radius of the circular arc forming the first and/or the second contour is in a range from 0.8 up to 1.2 times the outer radius of the parking lock gearwheel. In particular, the radius of the circular arc contour is equal to the outer radius of the parking lock gearwheel, i.e. the mid-point of the contour circle is in the area of and offset relative to the rotational axis of the parking lock gearwheel. A curvature radius for the first and/or second contour with this order of magnitude results in a relatively small, constant impulse, i.e. reduced dynamic loading of the parking lock.

BRIEF DESCRIPTION OF THE DRAWINGS

Example embodiments of the invention are illustrated in the drawing and will be described in more detail below, so that further features and/or advantages can emerge from the description and/or the drawing, which shows:

FIGS. 4a, 4a1, 4b, 4b1, 4c, 4c1: Three contact situations of the parking lock gearwheel and the parking lock pawl, which are kinematically linked by a linear function of the pivoting angle and the rotation angle;

FIGS. 5a, 5a1, 5b, 5b1, 5c, 5c1: Another example embodiment of the invention, with crown tip reliefs on both sides and linear kinematics;

FIGS. 6a, 6a1, 6b, 6b1, 6c, 6c1: A further example embodiment of the invention, with an optimized wheel tooth contour and the corresponding kinematics;

FIGS. 7a, 7a1, 7b, 7b1, 7c, 7c1: A further example embodiment of the invention, with an optimized pawl tooth contour and the corresponding kinematics;

DETAILED DESCRIPTION OF THE PREFERRED EMBODIMENTS

Figure 1A:
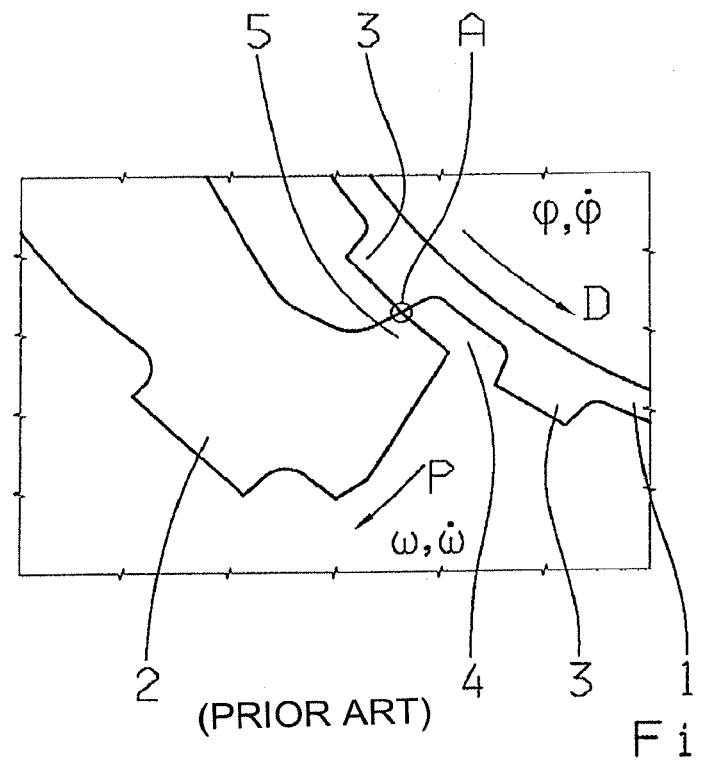
FIGS. 1a, 1b: Two engagement situations of a parking lock pawl and a parking lock gearwheel.
Figure 1B:
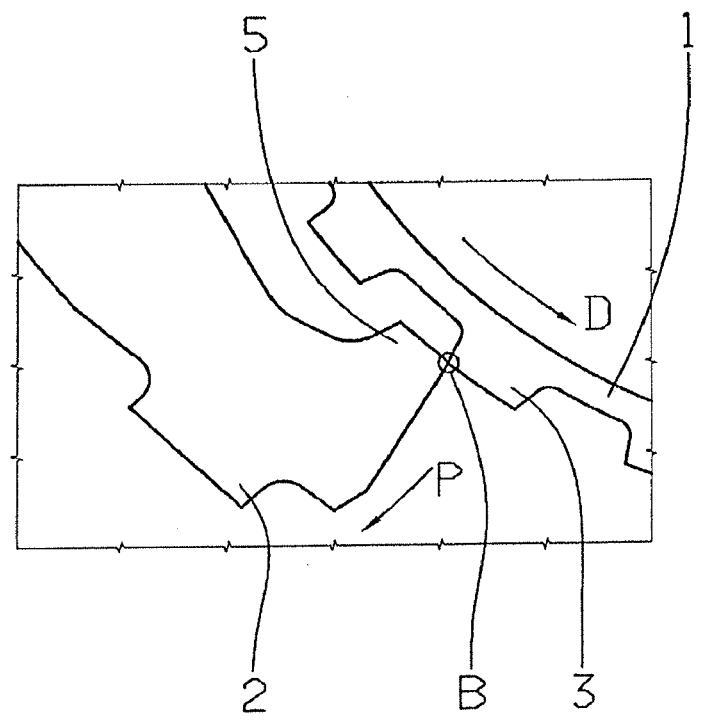

FIGS. 1a and 1b show two positions of contact between a parking lock gearwheel 1 and a parking lock pawl 2 of a parking lock device (not shown in full), which can be used for example for an automatic transmission or even a dual-clutch transmission of a motor vehicle. As is known, the parking lock device serves to lock a transmission output shaft (not shown) mechanically, in order to prevent the vehicle from rolling away. The parking lock gearwheel 1 is connected to the transmission output shaft (not shown) in a rotationally fixed manner and undergoes rotational movement in the direction of the arrow D with a rotational angle $\varphi$ and a rotational speed $\varphi$-dot ($\dot{\varphi}$). The parking lock pawl 2 is mounted to pivot in a transmission housing (not shown) and, when the two tooth crowns rest against one another, undergoes a pivoting movement in the direction of the arrow P with the pivoting angle $\omega$ and the pivoting speed $\omega$-dot ($\dot{\omega}$). The parking lock gearwheel 1, also referred to in what follows as just the wheel 1 for the sake of brevity, has on its circumference a tooth array with teeth 3 and tooth gaps 4, whereas the parking lock pawl 2, or just pawl 2 for brevity in what follows, has a pawl tooth 5 which engages in a tooth gap 4 in order to block rotation of parking lock gearwheel 1. FIG. 1a shows a first position in which the tooth 3, also called the wheel tooth 3, which rotates counter-clockwise, makes contact with the pawl tooth 5 at a point A. Thus, the point A marks the beginning of a contact zone between the wheel tooth 3 and the pawl tooth 5. FIG. 1b shows a second position in which a point B marks the end of the contact zone between the wheel tooth 3 and the pawl tooth 5.

A parking lock device is generally designed for a particular drop-in speed, i.e. a limit speed of the vehicle at which the pawl tooth 5 can just still drop into the tooth gap 4 and so produce a blocking position. However, a parking lock must also fulfill a so-termed rejection condition, i.e. if at a vehicle speed above the drop-in speed, the pawl is engaged—be it mistakenly or due to a defect—the pawl tooth 5 must not fall into the tooth gap 4, since this would result in damage or failure. Rather, by virtue of suitable tooth geometry the pawl tooth 5 must be rejected, this generally taking place by a crown tip relief for example on the pawl tooth. This process of continual rejection at speeds above the drop-in speed is called ratcheting, and is generally associated with particular dynamic behavior, i.e. the locking pawl 2, is continually accelerated and decelerated in the pivoting direction indicated by the arrow P and in the opposite direction. Here, this is also referred to as an oscillating pivoting motion. The impact loading that occurs during ratcheting will be examined and explained in more detail with reference to the diagrams that follow.

Figure 2:
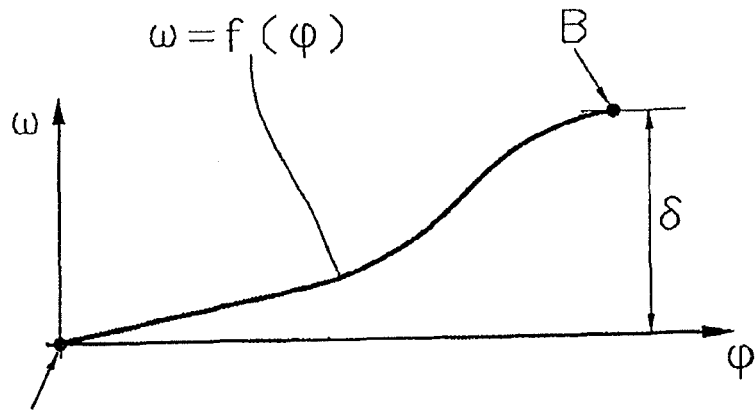
FIG. 2: A graphical representation of a function of the pivoting angle of the pawl against the rotation angle of the gearwheel of a parking lock device of the prior art.

FIG. 2 shows the results of a study by the present applicant, namely the relationship between the pivoting angle $\omega$ of the locking pawl 2 and the rotational angle $\phi$ of the parking lock gearwheel 1. The points A, B of the function $\omega=f(\phi)$ correspond to the contact points A, B in FIGS. 1a and 1b. The shape of the function $\omega=f(\phi)$ is characterized by a variety of slopes: at first the curve rises smoothly, then it enters a steeper zone and finally, at the point B, this becomes somewhat less steep again. The pivoting angle $\omega$ at the point B, i.e. at the end of the contact stretch, can also be referred to as the radial stroke of the pawl tooth 5 and corresponds to a crown tip relief $\delta$ at the wheel tooth 3 and the pawl tooth 5.

Figure 2A:
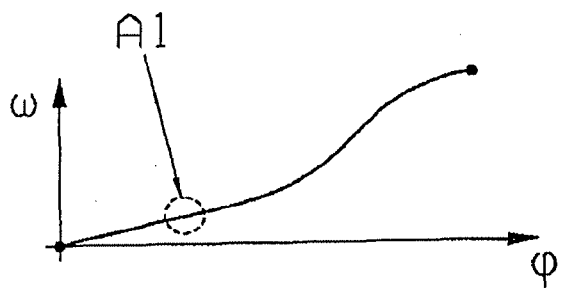
FIGS. 2a, 2b, 2c: Various impact situations of the parking lock pawl on the parking lock gearwheel.
Figure 2B:
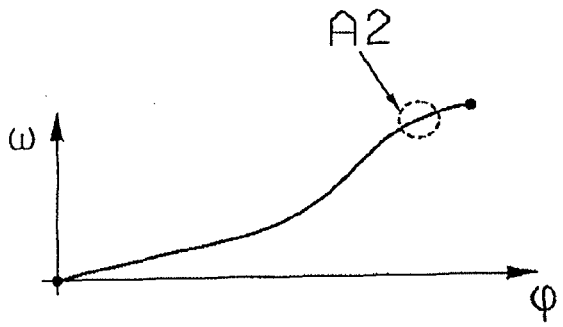
Figure 2C:
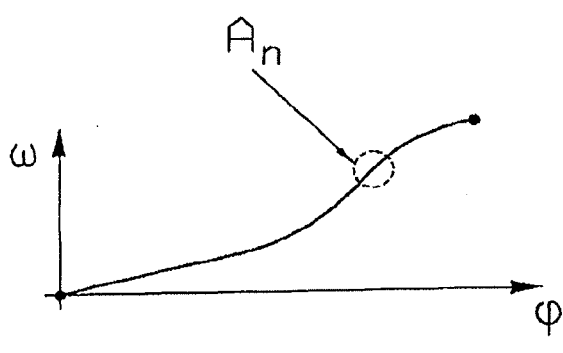

FIGS. 2a, 2b, 2c show various impact situations of the pawl 2 on the parking lock gearwheel 1, i.e. of the pawl tooth 5 on one of the wheel teeth 3. FIG. 2a shows an impact at a point A1, i.e. in an area where the slope of the curve is relatively shallow. A shallow slope in this case means that the pivoting angle $\omega$ of the pawl changes relatively slowly, i.e. the pivoting speed $\omega$-dot is relatively small—so the pawl is subjected to a relatively slight (rotational) impulse. FIG. 2b shows an impact of the pawl at a point A2, i.e. in an area where the slope is steeper than at point A1. This means that the pawl experiences a stronger impulse. The impulse is physically defined as the product of mass and speed, and in this case the speed is the pivoting speed $\omega$-dot of the locking pawl. Finally, FIG. 2c shows an arbitrary impact point $A_n$. As mentioned, the curve shape shown in FIG. 2 is based on contours of the wheel tooth and the pawl tooth according to the prior art. From this the inventors derived the knowledge that depending on the point of impact the locking pawl experiences different impulses, leading to the dynamics mentioned earlier. Accordingly, the inventors recognized that there is a direct relationship between the kinematic relation of the pawl and wheel in tooth contact, and the dynamics of the pawl's movement during ratcheting.

Figure 3:
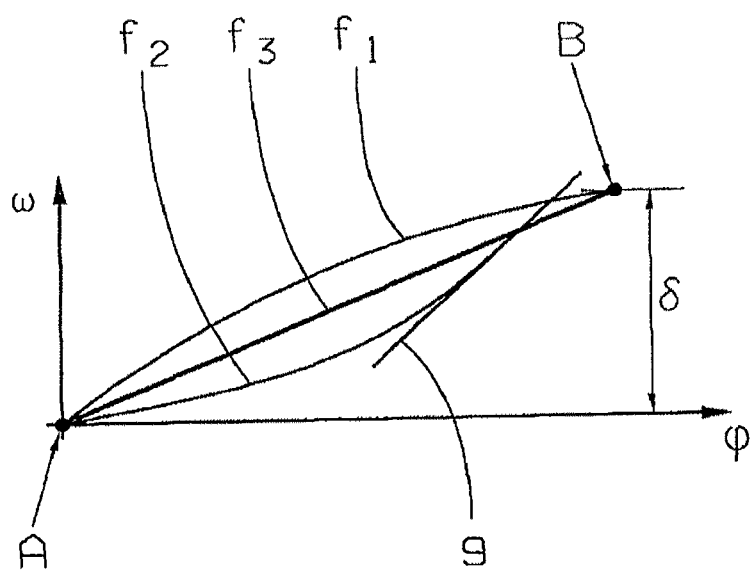
FIG. 3: Selected functions of the pivoting angle of the pawl against the rotation angle of the gearwheel.

FIG. 3 shows various notional functions for the pivoting angle $\omega$ of the pawl, plotted against the rotation angle $\phi$ of the wheel, taking the above-mentioned knowledge into account. As examples three functions f1, f2, f3 are represented, such that f1 shows a progressive course, f2 a degressive course and f3 a linear course from the beginning up to the end of the contact between the teeth. For the degressive function f2 a line g shows the gradient, i.e. the slope at a given point, which corresponds to the pivoting speed $\omega$-dot ($\omega$). The respective variable slope of the functions f1, f2 brings about the undesired effect that the impact loading of the parking lock depends on the precise location of the tooth contact. In contrast, the linear course of the function f3 with a constant slope leads to an impulse on the pawl which is at least to a large extent independent of the precise location of the tooth contact.

Figure 4A:
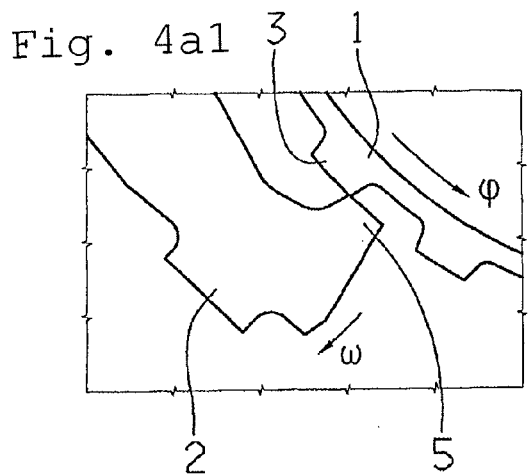
Figure 4A:
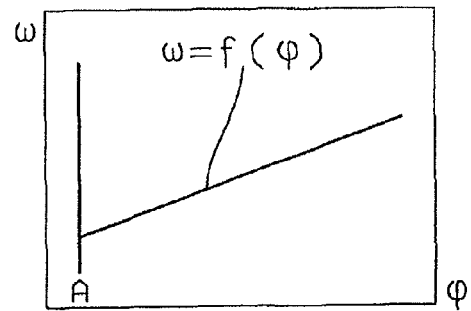
Figure 4B:
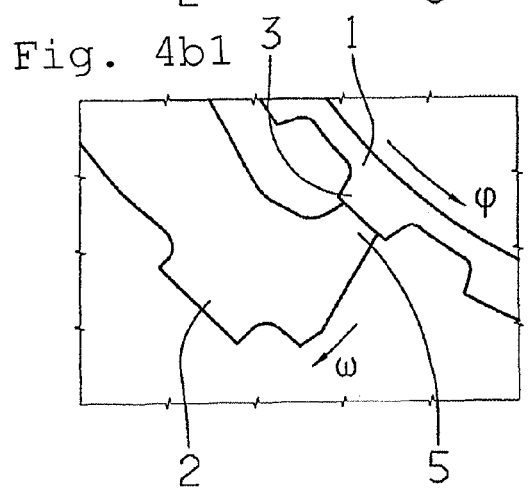
Figure 4B:
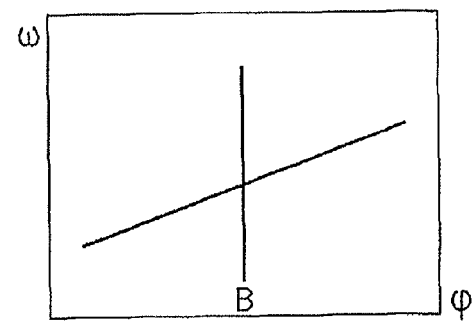
Figure 4C:
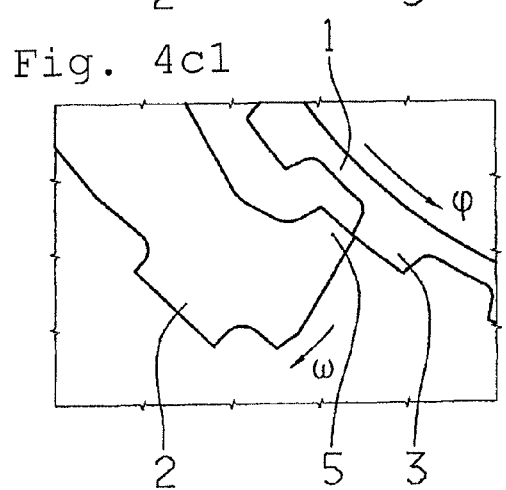
Figure 4C:
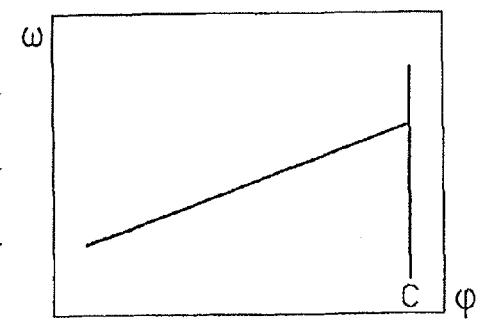

FIGS. 4a1, 4b1, 4c1 show on the one hand three positions for a tooth contact between the parking lock gearwheel 1 and the pawl 2, the wheel tooth 3 and the pawl tooth 5 being designed in such manner that as shown in FIGS. 4a, 4b, 4c a linear course is obtained for the function $\omega=f(\phi)$. Regardless of whether the pawl tooth 5 encounters the wheel tooth 3 at the position as shown in the adjacent FIGS. 4a1, 4b1, 4c1 there is in each case a uniformly increasing pivoting angle $\omega$, i.e. a constant pivoting speed $\omega$-dot ($\omega$) and therefore a constant impulse is transmitted from the wheel 1 to the pawl 2. Thereby, the dynamic during the process of ratcheting is considerably attenuated.

Figure 5A:
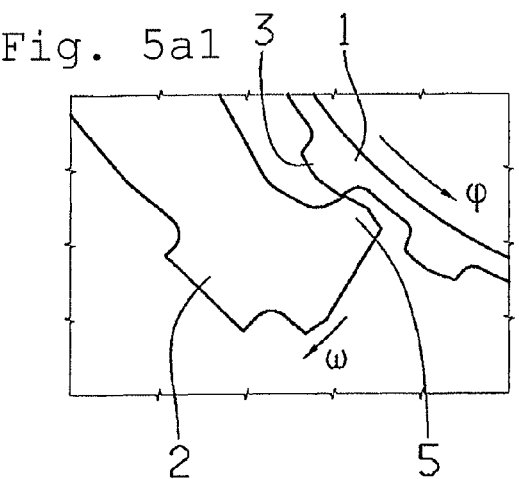
Figure 5A:
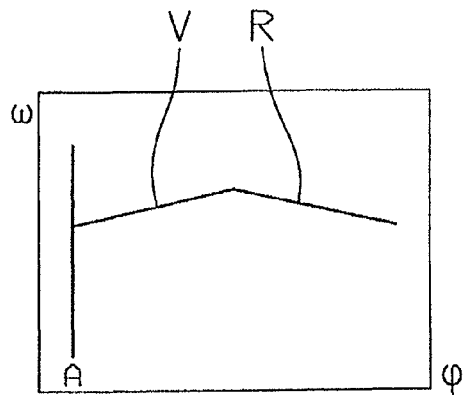
Figure 5B:
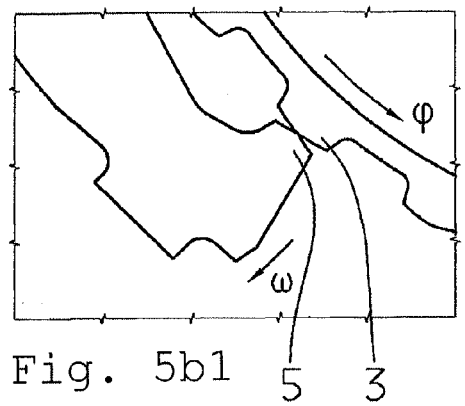
Figure 5B:
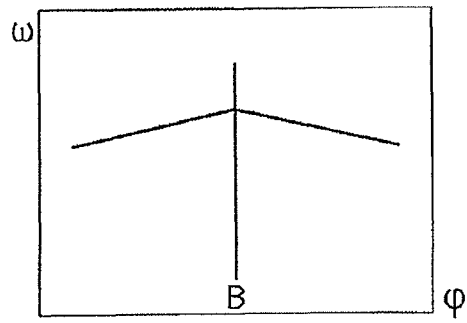
Figure 5C:
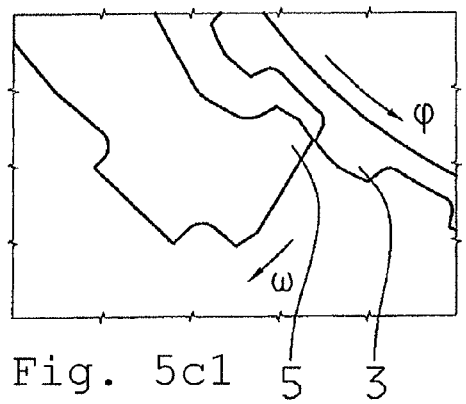
Figure 5C:
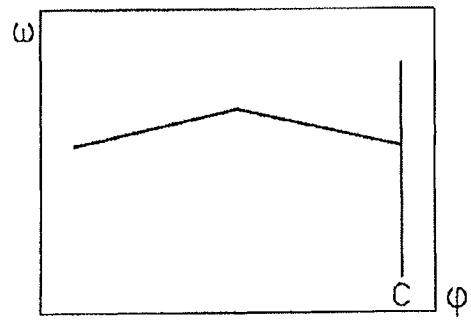

FIGS. 5a1, 5b1, 5c1 show a further development of the invention, such that a crown tip relief is formed on the forward and also on the rear tooth flank. The result of this is that the pawl 2 is rejected both when the parking lock gearwheel 1 is rotating forward and when it is rotating backward. The diagrams of to FIGS. 5a to 5c show in each case on the left a linearly rising branch of the curve and on the right a linearly falling curve branch, indexed with the letters V, R. In the diagrams shown there is a symmetrical division for forward and backward ratcheting. However, the division can also be unsymmetrical, for example 1:2 or 2:3. This allows for the different speeds when driving forward or in reverse.

Figure 6A:
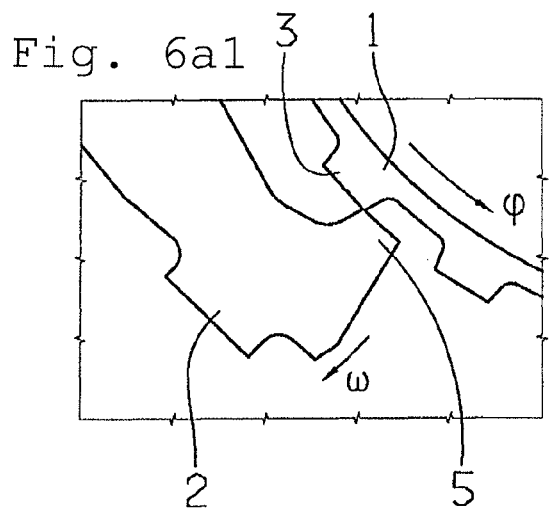
Figure 6A:
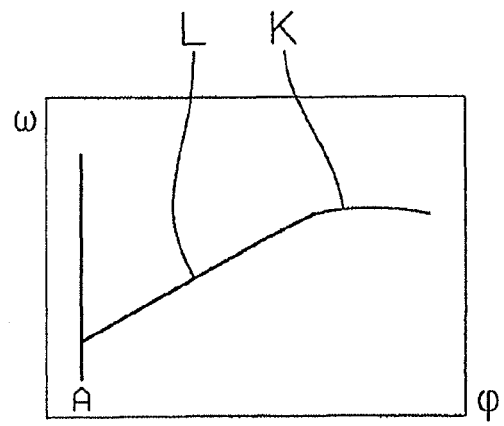
Figure 6B:
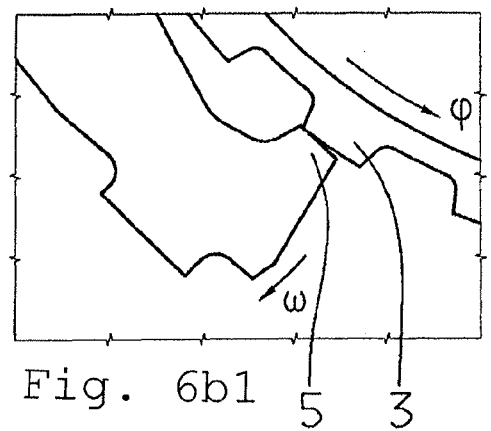
Figure 6B:
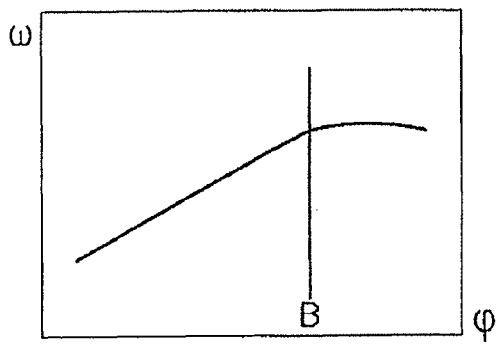

FIGS. 6a1, 6b1, 6c1 show another embodiment of the invention, such that only one of the two components involved, namely the contour of the wheel tooth 3, is optimized in such manner that the functional shape shown in the FIGS. 6a1, 6b1, 6c1 is obtained. The contour of the wheel tooth 3 is designed such that for the contact zone from FIG. 6a1 to FIG. 6b1 a linear course L of the function $\omega=f(\phi)$ is obtained (FIGS. 6a, 6b). In contrast, for the contact zone from the position in FIG. 6b1 to the position in FIG. 6c1 the course K of the pivoting angle $\omega$ is approximately constant, since the contour of the pawl tooth 5 is not optimized but rather, for example, consists of a flat tooth crown surface.

Figure 6C:
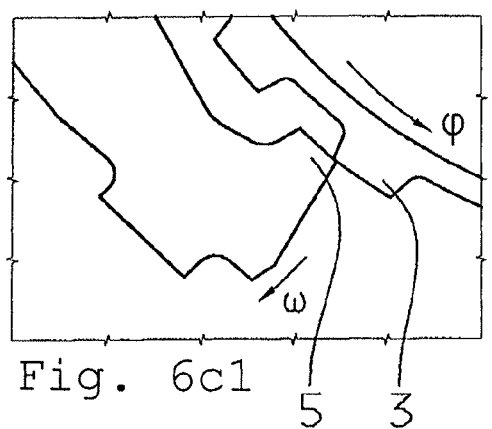
Figure 6C:
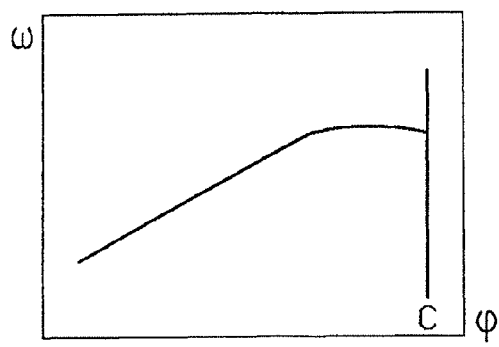
Figure 7A:
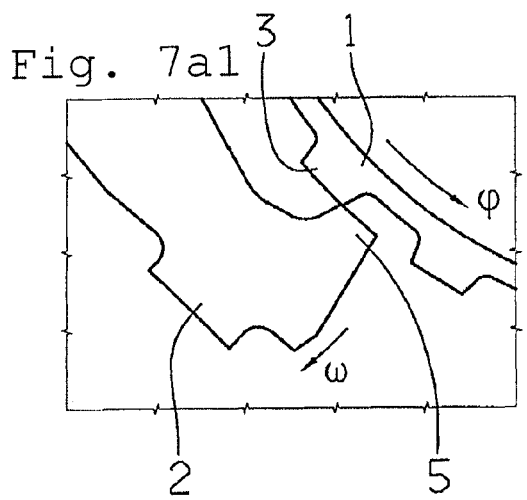
Figure 7A:
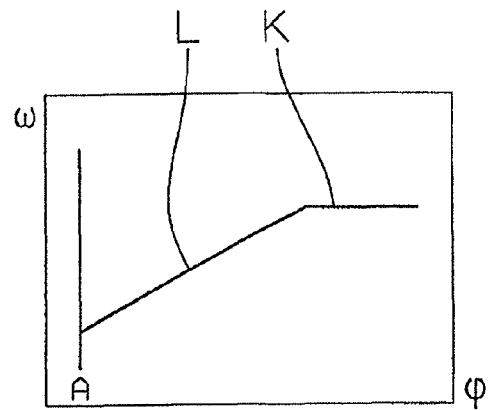
Figure 7B:
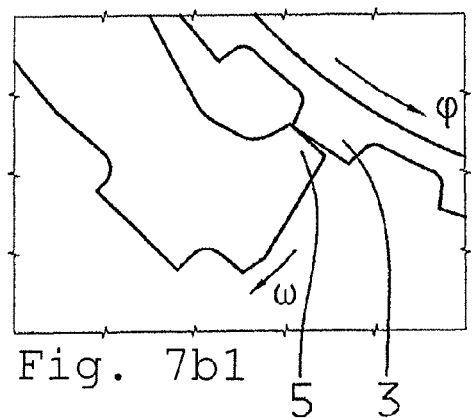
Figure 7B:
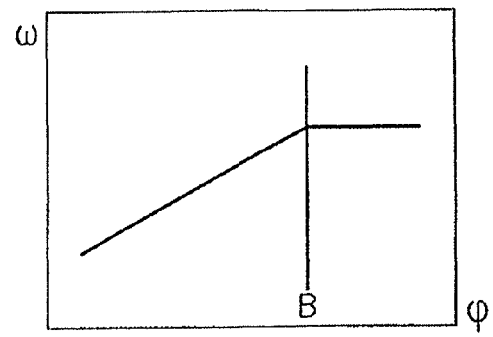
Figure 7C:
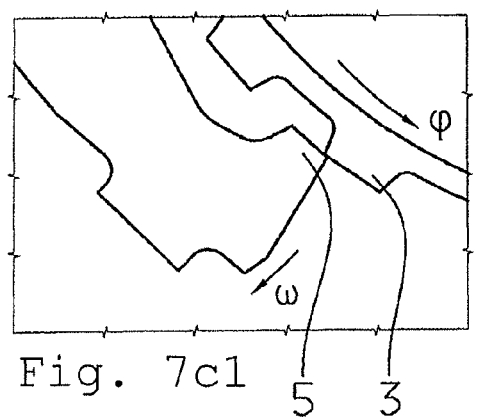
Figure 7C:
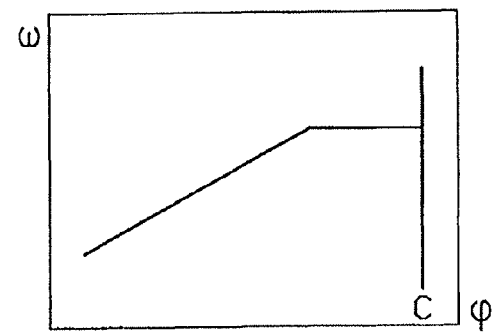

A course of the function $\omega=f(\phi)$ similar to FIGS. 6a to 6c is obtained if, according to the invention, the tooth crown of the parking lock pawl is made concave and co-operates with a parking lock gearwheel whose teeth have no crown tip relief, i.e. having a cylindrical outer contour. The corresponding example embodiment is illustrated in FIGS. 7a1, 7b1 and 7c1, and in this case only the contour of the pawl tooth 5 is optimized, in such manner that the $\omega=f(\phi)$ function shape shown in FIGS. 7a, 7b, 7c is obtained.

Figure 8:
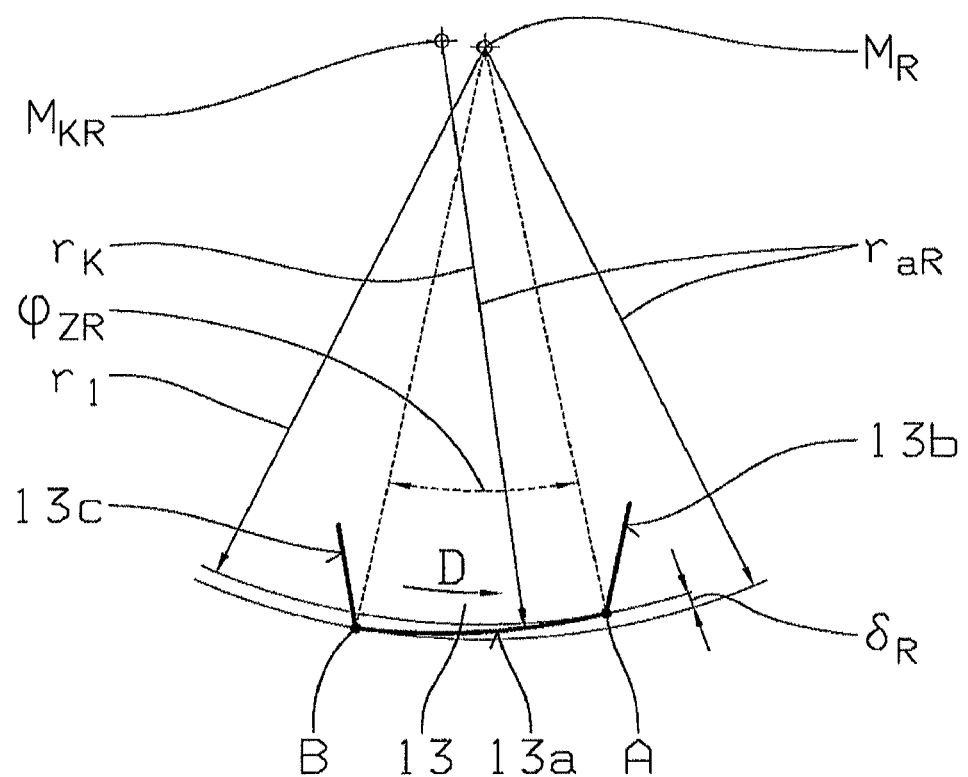
FIG. 8: A schematic representation of a wheel tooth with tooth contour according to the invention.

FIG. 8 shows a schematic representation of a tooth 13 of a parking lock gearwheel (not shown) with mid-point $M_R$, through which the rotational axis of the parking lock gearwheel passes. The parking lock gearwheel has an outer radius $r_{aR}$ and a radius $r_1$, and the difference between these two radii is what is referred to as the crown tip relief $\delta_R$. The profile of the wheel tooth 13, i.e. a section perpendicular to the rotational axis through the mid-point $M_R$, has a convex tooth crown surface 13a, also referred to in what follows as the contour 13a, a front tooth flank 13b relative to the rotational direction indicated by the arrow D, and a rear tooth flank 13c relative to the rotational direction D. The front tooth flank 13b merges into the contour 13a at the point A and the rear tooth flank 13c merges with the contour 13a at point B. Point A lies on the radius $r_1$ while in contrast point B lies on the outer radius $r_{aR}$, both centered around the mid-point $M_R$. Thus the point A, which is in front relative to the rotational direction D, is set back by the amount of the crown tip relief $\delta_R$. As explained earlier, the crown tip relief $\delta_R$ serves to reject the pawl during ratcheting. According to the invention, the contour 13a between points A and B is in the form of a circular arc with outer radius $r_{aR}$ about a mid-point $M_{KR}$. Thus, the tooth crown surface 13a is a circular-cylindrical surface with constant curvature, with $M_{KR}$ as the mid-point of the curvature and $r_K$ the radius of the curvature. The width of the wheel tooth 13 is indicated by a sector $\phi_{ZR}$. The tooth width $\phi_{ZR}$ is decisive for calculating the crown tip relief $\delta_R$.

Figure 9:
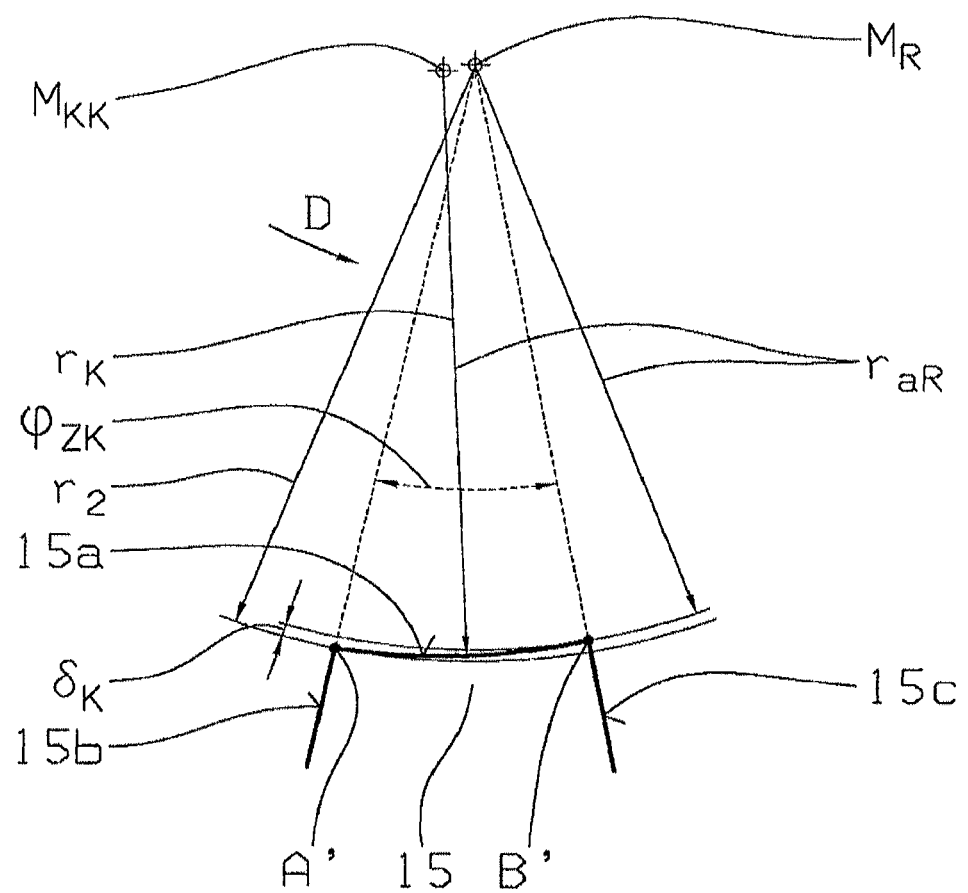
FIG. 9: A schematic representation of a pawl tooth with tooth contour according to the invention.

FIG. 9 represents schematically a pawl tooth 15 of a locking pawl (not shown). The pawl tooth 15 has a concavely shaped tooth crown surface 15a, also called the contour 15a in what follows, which extends in the rotational direction D of the parking lock gearwheel (not shown here) from a forward point A to a rear point B. A tooth flank at the front relative to the rotational direction D is indexed 15b and called the forward tooth flank, and a tooth flank at the back relative to the rotational direction D is indexed 15c and called the rear tooth flank. Referring to FIG. 8, the point A of the wheel tooth 13 therefore first passes the point A of the pawl tooth 15. The point B lies on the outer radius $r_{aR}$ of the parking lock gearwheel around the mid-point $M_R$. The tooth width is indicated by a sector $\phi_{ZK}$. Relative to the point B, the point A is offset in the radial direction outward by the amount of a crown tip relief $\delta_K$. It therefore lies on a radius $r_2$, which is the sum of the outer radius $r_{aR}$ and the crown tip relief $\delta_K$ for the pawl. The total crown tip relief $\delta$ is composed of the fraction $\delta_R$ for the wheel and the fraction $\delta_K$ for the pawl, so that:

$$\delta=\delta_R+\delta_K$$

According to the invention, the contour 15a between points A and B is a circular arc with outer radius $r_{aR}$, i.e. the tooth crown surface 15a is a hollow-cylindrical surface with constant curvature. The mid-point of the curvature circle is indicated as $M_{KK}$ and the radius of curvature as $r_K$. The fractions of the crown cut-backs for the wheel tooth 13 and the pawl tooth 15 behave as do their tooth widths, i.e. according to:

$$\delta_R:\delta_K=\phi_{ZR}:\phi_{ZK}$$

Starting from a specified total crown tip relief $\delta$, the fractions $\delta_R$ for the wheel and $\delta_K$ for the pawl are then obtained from the following two equations:

$$\delta_R=\delta\cdot\phi_{ZR}/(\phi_{ZR}+\phi_{ZK})$$

$$\delta_K=\delta\cdot\phi_{ZK}/(\phi_{ZR}+\phi_{ZK})$$

A parking lock gearwheel with the wheel tooth contour 13a (first contour) and a parking lock pawl with the pawl tooth contour 15a (second contour) result in a linear course of the function $\omega=f(\phi)$, as shown in the diagrams of FIGS. 4a, 4b, 4c.

In the example embodiment represented in FIG. 8 and FIG. 9, the radius of curvature $r_K$ is equal to the outer radius $r_{aR}$. However, it is within the scope of the invention to choose the radius of curvature $r_K$ larger or smaller than the outer radius $r_{aR}$, for example by up to 20% larger or smaller. Thus, in practical tests a variant for example with a difference of around 10% proved suitable.

INDEXES

1 Parking lock gearwheel
2 Parking lock pawl
3 Wheel tooth
4 Tooth gap
5 Pawl tooth
13 Wheel tooth
13a Contour
13b Front tooth flank
13c Rear tooth flank
15 Pawl tooth
15a Contour
15b Front tooth flank
15c Rear tooth flank
$\omega$ Pivoting angle
$\omega$-dot, $\omega$ Pivoting rate
$\phi$ Rotation angle (wheel)
$\phi$-dot, $\phi$ Rotation speed
$\phi_{ZR}$ Tooth width (wheel)
$\phi_{ZK}$ Tooth width (pawl)
$\delta$ Crown tip relief
$\delta_R$ Crown tip relief (wheel)
$\delta_K$ Crown tip relief (pawl)
A1, A2 Impact point
$A_n$ Impact point
D Rotation direction (wheel)
g Line (gradient)
$M_R$ Mid-point of wheel
$M_{KR}$ Mid-point of wheel/contour
$M_{KK}$ Mid-point of pawl/contour
$r_{aR}$ Outer radius (wheel)
$r_K$ Radius of curvature (contour)
$r_1$ Radius
$r_2$ Radius

The invention claimed is:

1. A parking lock device for a motor vehicle, the parking lock device comprising:
a parking lock gearwheel (1) with teeth (3) and tooth gaps (4) and a parking lock pawl (2) with a pawl tooth (5),
the parking lock gearwheel (1) undergoing a rotation movement with rotation angle ($\phi$) and rotational speed ($\phi$-dot) about a rotational axis and the parking lock pawl (2) undergoes a pivoting movement with pivoting angle ($\omega$) and pivoting speed ($\omega$-dot) around a pivot axis arranged parallel to the rotational axis;
the teeth of the parking lock gearwheel each have a first flank that connects to a tip contour at a first point and a second tooth flank that connects to the tip contour at a second point, the first and the second points are located at opposite sides of the contour in relation to the rotational movement of the parking lock gearwheel, the first point of the contour defines an inner radius of the parking lock gearwheel and the second point defines an outer radius of the parking lock gearwheel that is greater than the inner radius of the parking lock gearwheel;
such that above a predefined drop-in speed, the parking lock pawl (2) is rejected by the teeth (3) of the parking lock gearwheel (1) and therefore undergoes an oscillating pivoting movement; and
the parking lock gearwheel (1) and the parking lock pawl (2) are kinematically linked, during relative motion, with one another by a linear relationship between the pivoting angle ($\omega$) and the rotational angle ($\phi$).

2. A parking lock device for a motor vehicle transmission, the parking lock device comprising:
a parking lock gearwheel (1) having gearwheel teeth (3) and tooth gaps (4) and a parking lock pawl (2) with a pawl tooth (5);
the parking lock gearwheel (1) is rotatable about a rotational axis, the parking lock gearwheel rotates through a rotational angle ($\phi$) when rotating at a rotational speed ($\phi$-dot) about the rotational axis and the parking lock pawl (2) is pivotable about a pivot axis, the parking lock pawl pivots through a pivoting angle ($\omega$) when pivoting at a pivoting speed ($\omega$-dot) around the pivot axis which is arranged parallel to the rotational axis;
the gearwheel teeth (3, 13) of the parking lock gearwheel (1) each have a first contour (13a) and front and rear tooth flanks (13b, 13c) as viewed in a rotational direction (D) of the parking lock gearwheel (1);
the pawl tooth (5, 15) having a second contour (15a) and front and rear tooth flanks (15b, 15c) relative to the rotational direction (D) of the parking lock gearwheel (1), and the second contour defines a circular arc;

and the parking lock gearwheel (1) having an outer radius ($r_{aR}$), the outer radius of the parking lock gearwheel being defined as the radius of the largest circle circumscribed by the gearwheel teeth during rotation of the parking lock gearwheel;

at least one of the first and the second contours (13a, 15a) is formed at least partially in accordance with a mathematical function, the at least one of the first and the second contours has a contour curvature, a difference between the contour curvature and the outer curvature of the parking lock gearwheel (1) is less than or equal to 20% of the outer curvature of the parking lock gearwheel, and a value of the outer curvature of the parking lock gearwheel is defined as a reciprocal value of the outer radius ($r_{aR}$) of the parking lock gearwheel (1); and at least one of the pawl tooth and the gearwheel teeth (13) having a crown tip relief ($\delta$) relative to the outer radius ($r_{aR}$) of the parking lock gearwheel (1) in an area of the front tooth flank (13b, 15b) of the at least one of the parking lock gearwheel (1) and the parking lock pawl (2).

3. The parking lock device according to claim 2, wherein the mathematical function defines a circle with a radius that differs from the outer radius ($r_{aR}$) of the parking lock gearwheel (1) by at most 20%.

4. The parking lock according to claim 2, wherein the mathematical function defines an ellipse with semi-axes that differ from the outer radius ($r_{aR}$) of the parking lock gearwheel (1) by at most 20%.

5. The parking lock device according to claim 2, wherein the crown tip relief ($\delta$) comprises a fraction ($\delta_R$) for the teeth (13) of the parking lock gearwheel (1) and a fraction ($\delta_K$) for the pawl tooth (15).

6. The parking lock device according to claim 5, wherein the fractions ($\delta_R$, $\delta_K$) of the crown tip relief ($\delta$) for the teeth (13) and for the pawl tooth (15) are equal to respect widths of the teeth and the pawl tooth ($\phi_R$, $\phi_K$).

7. The parking lock device according to claim 2, wherein at least one of the teeth (13) and the pawl tooth (15) have a crown tip relief, in an area of the rear tooth flank (13c, 15c), which merges into circular arc sections.

8. The parking lock device according to claim 2, wherein the first contour (13a) is of convex shape in relation to the rotational axis ($M_R$).

9. The parking lock device according to claim 2, wherein the second contour (15a) is of concave shape in relation to the rotational axis ($M_R$).

10. The parking lock device according to claim 2, wherein the front tooth flank of the gearwheel teeth, when viewed in cross section, contacts an end of the first contour at a front impact point and the rear flank of the gearwheel teeth, when viewed in cross section, contacts an opposite end of the first contour at a rear impact point, the front impact point of the gearwheel teeth defines the outer radius of the parking lock gearwheel and the rear impact point of the gearwheel teeth defines an inner radius of the parking lock gearwheel that is different from the outer radius of the parking lock gearwheel.

11. The parking lock device according to claim 10, wherein the front tooth flank of the pawl tooth, when viewed in cross section, contacts an end of the second contour at a front impact point and the rear flank of the pawl tooth, when viewed in cross section, contacts an opposite end of the second contour at a rear impact point, when the rear impact point of the pawl tooth is located at the outer radius of the parking lock gearwheel, the front impact point of the locking pawl defines an exterior radius of the locking pawl that is different from the outer radius of the parking lock gearwheel.

12. The parking lock device according to claim 11, wherein the inner radius of the parking lock gearwheel is shorter than the outer radius of the parking lock gearwheel and, when the rear impact point of the pawl tooth is located at the outer radius of the parking lock gearwheel, the exterior radius of the locking pawl is greater than the outer radius of the parking lock gearwheel.

13. The parking lock device according to claim 2, wherein the first and the second contours are each a circular arc.

14. The parking lock device according to claim 2, wherein the rotational angle of the parking lock gearwheel and the pivoting angle of the locking pawl are directly proportional to each other.

15. A parking lock device for a motor vehicle transmission, the parking lock device comprising:
a parking lock gearwheel (1) having gearwheel teeth (3) and tooth gaps (4) and a parking lock pawl (2) with a pawl tooth (5);

the parking lock gearwheel (1) rotates about a rotational axis through a rotational angle ($\phi$) at a rotational speed ($\phi$-dot) and the parking lock pawl (2) pivots about a pivot axis through pivoting angle ($\omega$) at a pivoting speed ($\omega$-dot), the pivot axis is parallel to the rotational axis;

the gearwheel teeth (3, 13) of the parking lock gearwheel (1) each having a non-linear first contour (13a) and front and rear tooth flanks (13b, 13c) when viewed in a direction of rotation (D) of the parking lock gearwheel (1);

the pawl tooth (5, 15) having a non-linear second contour (15a) and front and rear tooth flanks (15b, 15c) when viewed relative to the direction of rotation (D) of the parking lock gearwheel (1);

the parking lock gearwheel (1) having an outer radius ($r_{aR}$), the outer radius of the parking lock gearwheel being defined as the radius of the largest circle circumscribed by the gearwheel teeth during rotation of the parking lock gearwheel;

the first and the second contours (13a, 15a) being formed at least partially in accordance with a mathematical function each of the first and the second contours has a curvature that is at most 20% different than an outer curvature of the parking lock gearwheel (1) which is defined as a reciprocal value of the outer radius ($r_{aR}$) of the parking lock gearwheel (1); and at least one of the gearwheel teeth (13) and the pawl tooth (15) have a crown tip relief ($\delta$) relative to the outer radius ($r_{aR}$) of the parking lock gearwheel (1) in an area of the front tooth flank (13b, 15b) of the gearwheel teeth of the parking lock gearwheel (1) and pawl tooth of the parking lock pawl (2).

16. The parking lock device according to claim 15, wherein at least one of the first and the second contours (13a, 15a) has a radius of curvature ($r_K$) which is in the range of 0.8 ($r_{aR}$) ≤ radius of curvature ($r_K$) ≤ 1.2($r_{aR}$), where ($r_{aR}$) is the outer radius of the parking lock gearwheel.

17. The parking lock device according to claim 16, wherein the radius of curvature ($r_K$) of the at least one of the first and the second contours (13a, 15a) is equal to the outer radius ($r_{aR}$) of the parking lock gearwheel.

* * * * *